US005471218A

United States Patent [19]
Talbot et al.

[11] Patent Number: 5,471,218
[45] Date of Patent: Nov. 28, 1995

[54] INTEGRATED TERRESTRIAL SURVEY AND SATELLITE POSITIONING SYSTEM

[75] Inventors: Nicholas C. Talbot, Cupertino; Mark Nichols, Sunnyvale, both of Calif.

[73] Assignee: Trimble Navigation Limited, Sunnyvale, Calif.

[21] Appl. No.: 86,665

[22] Filed: Jul. 1, 1993

[51] Int. Cl.[6] ............................. G01S 5/02; H04B 7/185
[52] U.S. Cl. ............................................................ 342/357
[58] Field of Search ................................... 342/357, 352, 342/386, 125, 58, 457, 56, 458; 364/449, 560, 460

[56] References Cited

U.S. PATENT DOCUMENTS

| | | | |
|---|---|---|---|
| 4,814,711 | 3/1989 | Olsen et al. | 342/357 |
| 4,949,089 | 8/1990 | Ruszkowski, Jr. | 342/52 |
| 5,233,357 | 8/1993 | Ingesand et al. | 342/352 |
| 5,311,194 | 5/1994 | Brown | 342/357 |

*Primary Examiner*—Gregory C. Issing
*Attorney, Agent, or Firm*—John Schipper

[57] ABSTRACT

Apparatus for measuring surveying parameters, such as distances and angular displacements between survey stations, with improved accuracy. The invention combines a differential satellite positioning system (SATPS), available with positioning systems such as GPS and GLONASS, with electromagnetic measurements of distances and optically encoded angles by a conventional electro-optical survey instrument to provide survey measurements that can be accurate to within a few millimeters in favorable situations. The differential satellite positioning system relies upon carrier phase measurements, after removal of certain phase integer ambiguities associated with carrier phase SATPS signals. The SATPS may be retrofitted within the housing of the conventional electro-optical instrument.

40 Claims, 7 Drawing Sheets

INTEGRATED TERRESTRIAL SURVEY AND SATELLITE POSITIONING SYSTEM

FIELD OF THE INVENTION

This invention relates to surveying and to the use of Satellite Positioning System information to improve the accuracy and productivity of such surveying.

BACKGROUND OF THE INVENTION

As noted by A. Bannister and S. Raymond in *Surveying*, Pitman Publishing Ltd., London, 1977, general method of surveying was known and practiced more than 2000 years ago. The methods used at that time were simple but subject to consistency errors and required considerable time to perform. Surveying instruments have improved considerably since about 1900, taking advantage of advances in electronics, optics and other related disciplines. Recently, lasers, electro-optics, wave interaction and phase detection have been introduced into, and used in, surveying activities.

Use of a laser beam projector for surveying operations is disclosed in U.S. Pat. No. 3,471,234, issued to Studebaker. The beam rotates over terrain to be surveyed, and a beam point may be directed to a particular location and used to measure elevation and angular displacements within the region covered by the rotating beam.

Altman, in U.S. Pat. No. 3,669,548, discloses a method for determining a ship's heading or bearing, using an electro-optical angle measuring device that determines angles relative to a horizontal datum line. A plurality of parallel light beams, spaced apart by known, uniform distances and oriented at a known angle, forms a one-dimensional grid that covers the region where the ship is located. A rotating reflecting telescope on the ship has its axis aligned with one of the parallel light beams. The angle of the ship's longitudinal axis relative to the known direction of the parallel light beams is then easily read off to determine the ship's heading. This approach would not be suitable where the ship or other body whose angular orientation is to be determined can move over a large region.

Remote measurement of rotation angle of an object of interest by use of polarized light and electro-optical sensors is disclosed by Weiss et al in U.S. Pat. No. 3,877,816. The intensity of light transmitted serially through two linear polarization filters is proportional to the square of the cosine of the angle between the two polarization directions, and the proportionality constant can be determined by experiment. Unpolarized light transmitted along a first reference path with fixed polarization directions is compared with unpolarized light transmitted along a second, spatially separated and optically baffled path in which the polarization direction of one polarizer may vary. One or two light polarizers in each light beam path rotates at a constant angular velocity, which is the same for each path, and the difference in phase of the two received light signals is a measure of the angle of rotation of a polarizer (or the body to which the polarizer is attached) in the first path and a polarizer in the second path.

An optical-electronic surveying system that also determines and displays the angular orientation of a survey pole relative to a local horizontal plane is disclosed in U.S. Pat. No. 4,146,927, issued to Erickson et al. The system can receive and process range measurements directly from an electronic distance meter located near the system.

U.S. Pat. No. 4,443,103, issued to Erdmann et al, discloses use of a retro-reflective, electro-optical angle measuring system, to provide angle measurements after interruption of a signal that initially provided such information. A light beam is split into two beams, which intersect on a scanning mirror, which rotates or vibrates about a fixed axis, and the two beams are received at different locations on a retro-reflective tape positioned on a flat target surface on the target whose rotation is to be measured. These two beams form a plane that moves as the scanning mirror moves, with a reference plane being defined by the mirror at rest in a selected position. The scanning mirror sweeps the plane of the two beams across the target surface. A rotation angle of the target surface relative to the reference plane is determined, based upon the time difference between receipt of light from each of the two retro-reflected beams. The beam interception times coincide only if an edge of the retro-reflective tape is parallel to the reference plane. If receipt of light from the two retro-reflected beams is displayed on a synchronized, two-trace oscilloscope screen, the two "blips" corresponding to receipt of these two beams will have a visually distinguishable and measurable time difference $\Delta t$, as indicated in FIGS. 2A, 2B and 2C of the Erdmann et al patent. The time difference $\Delta t$ will vary as the scanning mirror moves. A second Erdmann et al patent, U.S. Pat. No. 4,492,465, discloses a similar approach but with different claims.

"Total station" electronic instrumentation for surveying, and more particularly for measurement of elevation differences, is disclosed by Wells et al in U.S. Pat. No. 4,717,251. A rotatable wedge is positioned along a surveying transit line-of-sight, which is arranged to be parallel to a local horizontal plane. As the wedge is rotated, the line-of-sight is increasingly diverted until the line-of-sight passes through a target. The angular displacement is then determined by electro-optical encoder means, and the elevation difference is determined from the distance to the target and the angular displacement. This device can be used to align a line-of-sight from one survey transit with another survey transit or to a retro-reflector. However, the angular displacement is limited to a small angular sweep, such as 12°.

Fodale et al disclose an electro-optical spin measurement system for use in a scale model airplane wind tunnel in U.S. Pat. No. 4,932,777. Optical targets (six) to receive and sense one or several light beams are located under the fuselage at the nose tip, on each of two sides of the fuselage, and under each wing tip, and a plurality of optical receivers are positioned on the perimeter of the wind tunnel to receive light from the optical targets at various angles, to determine airplane angle of attack and roll angle. The time-synchronized signals received at each receiver are recorded for subsequent analysis.

In U.S. Pat. No. 4,954,833, issued to Evans et al, information on deflection of the local vertical (obtained from gravity measurements) is combined with geodetic azimuth estimated from GPS signals to obtain an astronomical azimuth. This azimuth can be used for ballistic projectile delivery to a selected target. This method does not focus on integration of GPS operation with theodolite operation but, rather, seeks to avoid use of a theodolite to obtain the astronomical azimuth.

Kroupa et al, in U.S. Pat. No. 4,988,189, disclose use of a passive rangefinding system in combination with an electro-optical system, using image information obtained at two or more electro-optical system positions.

A method for simultaneously measuring the difference between orthometric (geoidal) height and height above a given ellipsoid for a site on the Earth's surface is disclosed by Evans in U.S. Pat. No. 5,030,957. Two or more leveling rods are held at fixed, spaced apart locations, with a known baseline vector between the rods. Each levelling rod holds a GPS signal antenna, receiver and processor that determines a GPS location for each rod. The geometric height of the GPS antenna (or of the intersection of the rod with the Earth's surface) is determined for each rod, and the geometric height difference is determined, using standard GPS survey measurements (accurate to within a few centimeters). A comparison of the orthometric height, usually found using a spirit level, and the height above the ellipsoid, obtained from a GPS measurement, provides a measure of the local gravitational field. The patent does not indicate, or perhaps recognize, advantages of use of height information to aid the GPS carrier phase initialization process but treats the GPS and the levelling rods as separate, non-interacting systems.

Ohishi et al disclose an optical distance measuring instrument using light transmitted and returned by retro-reflection in U.S. Pat. No. 5,054,911. A light beam pulse generated at the instrument is split into two pulses; one pulse is immediately received by a laser diode as a reference pulse. The other pulse is transmitted to a retro-reflector at a remote or adjacent target and returned to the instrument by retro-reflection thereat. The returning pulse is received by an optical fiber, having a known time delay $\Delta t$ and then received by the laser diode to provide a second pulse. The time delay $\Delta t$ is subtracted from the difference of arrival times of the two pulses and divided by $2c$ ($c$=ambient medium light velocity) to obtain the distance from instrument to target.

A somewhat unclear disclosure of a beam alignment apparatus and method is presented in U.S. Pat. No. 5,060,304, issued to Solinsky. Two substantially identical beam acquisition apparati are spaced apart from each other, each apparatus including two identical parabolic mirrors with parallel axes, each mirror having an axial aperture through which an electromagnetic wave beam passes and having a second smaller mirror located at the parabola's focal point. Each parabolic mirror has a third mirror consisting of a plurality of small retro-reflectors, located adjacent to but behind the parabolic mirror so that the parabolic mirror lies between the second and third mirrors. One parabolic mirror in each pair receives light from a transmitter positioned behind the mirror aperture and transmits this beam in a direction parallel to the mirror axis. The other parabolic mirror in each pair receives an incident beam propagating parallel to its axis and reflects this light to a receiver located behind the mirror aperture. One of the parabolic mirror pairs is operated in a search mode (moving) at a first selected frequency f1. The second parabolic mirror pair is operated in a "stare" mode at a selected frequency f2≠f1. As the two mirror pairs come close to alignment with each other, the mirror pairs sense this by receipt of a retro-reflected beam or a directly transmitted beam, the distinction being made by the frequency of the beam received. The search mode mirror pair, and then the stare mode mirror pair, can then be brought into alignment with each other.

A surveying instrument that uses GPS measurements for determining location of a terrestrial site that is not necessarily within a line-of-sight of the surveyor is disclosed in U.S. Pat. No. 5,077,557 issued to Ingensand. The instrument uses a GPS signal antenna, receiver and processor, combined with a conventional electro-optical or ultrasonic range finder and a local magnetic field vector sensor, at the surveyor's location. The range finder is used to determine the distance to a selected mark that is provided with a signal reflector to return a signal issued by the range finder to the range finder. The magnetic field vector sensor is apparently used to help determine the surveyor's location and to determine the angle of inclination from the surveyor's location to the selected mark.

U.S. Pat. No. 5,101,356, issued to Timothy et al, discloses a moving vehicle attitude measuring system that mounts three GPS signal antennas in a non-collinear configuration on the vehicle at predetermined distances from each other. Each antenna is connected to a GPS receiver/processor. The phases of rf signals arriving at the antennas are compared to determine the angular orientation of the plane containing the three antennas, and the angular orientation of the vehicle that carries these antennas.

Method and apparatus for measuring the relative displacement of two objects, applicable to monitoring of movement of adjacent material along an earthquake fault, is disclosed in U.S. Pat. No. 5,112,130, issued to Isawa. First and second optical distance measuring instruments (ODMIs) are placed at known locations astride a selected line (e.g., a fault line). First and second optical reflectors, also astride the selected line, are spaced apart by known distances from the first and second ODMIs. Distances from the first ODMI to the second reflector and from the second ODMI to the first reflector are measured ab initio and compared with subsequent readings of these two distances. If one or both of these distances changes, the magnitudes of the changes are used to determine how far the Earth on one side of the line has moved relative to the Earth on the other side of the line, as might occur in a slip along a fault line.

Ghaem et al disclose an electronic direction finder that avoids reliance on sensing of terrestrial magnetic fields for establishing a preferred direction for satellite signal acquisition in U.S. Pat. No. 5,146,231. The apparatus uses a receiver/processor for GPS or similar navigation signals received from a satellite, and requires (stored) knowledge of the present location of at least one reference satellite from which signals are received. The orientation of the finder or its housing relative to a line of sight vector from the finder to this reference satellite is determined. This orientation is visually displayed as a projection on a horizontal plane. Any other direction in this horizontal plane can then be determined with reference to this projection from a knowledge of the reference satellite location.

U.S. Pat. No. 5,142,400, issued to Solinsky, discloses a method for line-of-sight acquisition of two optical beam transceivers suitable for use in satellite communications. A first beam transceiver has an optical retro-reflector and initially operates in a passive or "stare" mode, with its beam transmitted in a fixed direction. A second transceiver performs a search over $2\pi$ steradians with its optical beam until it receives, from the first transceiver, either (1) a return of its own beam or (2) a distinguishable beam from the first transceiver. Boresight alignment is then maintained after beam-to-beam acquisition.

U.S. Pat. No. 5,146,290, issued to Hartrumpf, discloses apparatus for determining the position and angular orientation of an object. A partially silvered hemispherical light reflector is fixed to some part of the object, and two spaced apart laser beams are directed to intersect at the hemisphere center, to be (partly) retro-reflected at the hemisphere reflector surface, and to return toward the laser sources, to be detected by photodetectors located adjacent to each laser source. A portion of the beam from each laser source is transmitted through the hemispherical reflector and is received by a line or plane of photodetectors positioned on a plane behind the hemispherical reflector. As the object is translated or rotated, the locations where the reflected and transmitted beams are received by the photodetector arrays changes in a manner that can be related to the translation and/or rotation of the object.

A theodolite and tape have traditionally been used to measure horizontal and vertical angles and distances in terrestrial surveying. Recently, digital theodolites, as described in U.S. Pat. No. 3,768,911, issued to Erickson, and electronic distance meters (EDMs), as described by Hines et al in U.S. Pat. No. 3,778,159, have supplanted the theodolite and tape approach. Combination of an optical angle encoder and an EDM in an integrated package (called an "electronic total station"), as disclosed in U.S. Pat. No. 4,146,927, issued to Erickson et al, has led to automation of field procedures, plan production and design work.

Several limitations exist in use of a conventional total station. First, it is difficult to quickly establish the angular orientation and absolute location of a local survey or datum. Many surveys are not related to a uniform datum but exist only on a localized datum. In order to accurately orient a survey to a global reference, such as astronomical north, a star observation for azimuth is often used that requires long and complicated field procedures. Second, if a survey is to be connected to a national or state geodetic datum, the survey sometimes must be extended long distances, such as tens of kilometers, depending upon the proximity of the survey to geodetic control marks. Third, the electronic total station relies upon line-of-sight contact between the survey instrument and the rodman or pole carrier, which can be a problem in undulating terrains.

These systems do not provide the benefits of an integrated SATPS and terrestrial total station instrument. What is needed is a system that provides: (1) rapid azimuth and location determination in a fixed reference frame; (2) prompt resolution of the carrier phase ambiguities that occur in a SATPS; (3) distance and angle information without requiring line-of-sight contact between a reference station and a mobile station; (4) fail-safe capability for crosschecking, and calibrating the respective error sources in, the location information provided by the SATPS and by the terrestrial positioning system; and (5) capability for accounting for height differences between the geoid and ellipsoid over the local survey area.

SUMMARY OF THE INVENTION

These needs are met by the invention, which provides a surveying system that combines Satellite Positioning System (SATPS) techniques with new and with known survey techniques. The apparatus includes a first or reference station that provides a reference for the survey and whose location is determined with high accuracy, and a second or mobile station that is spaced apart from the first station and acts as a mobile measurement unit for the survey. More than one mobile station can be used simultaneously with one reference station. The reference station includes a first Satellite Positioning System (SATPS) antenna and first SATPS receiver/processor, connected together, for receiving SATPS signals from two or more SATPS satellites and for determining the location of the reference station according to the SATPS signals. The first SATPS receiver/processor is adapted for determining the difference, if any, between the location, known with high accuracy, of the reference station and the location of the reference station as determined by the SATPS satellite signals. The reference station also includes a reference station communications antenna, connected to the first SATPS receiver/processor, for transmitting or receiving station location and point attribute information. The reference station also includes an electronic distance meter (EDM) and digital theodolite, whose spatial orientation can be varied arbitrarily, connected to the first SATPS receiver/processor, for transmitting electromagnetic waves having a selected wavelength and for determining the distance from the reference station to the mobile station by receipt of a return electromagnetic signal from the mobile station, for determining the elevation difference, if any, between the reference station and the mobile station, and for determining the angular displacement between a line drawn between the reference station and the mobile station and a selected reference line.

The mobile station includes a second Satellite Positioning System (SATPS) antenna and second SATPS receiver/processor, connected together, for receiving SATPS signals from two or more SATPS satellites and for determining the location of the mobile station according to the SATPS signals. A second station communications antenna, connected to the second SATPS receiver/processor, for communicating with the reference station communications antenna and for transmitting to the reference station a signal containing feature and attribute information and information on the location of the mobile station as determined by the SATPS satellite signals, is also included in the mobile station. The mobile station also includes an electronic distance meter responder, adapted to receive the electromagnetic waves transmitted by the electronic distance meter and to provide a return electromagnetic signal that is received by the electronic distance meter at the reference station. The reference station communication means and the mobile station communication means are connected by a data link for transferring information from one station to the other station.

The invention provides a "total SATPS station", including first and second spaced apart SATPS station,,; whose relative separation is determined with high accuracy, as a supplement to survey equipment. Each of the first and second SATPS stations includes an SATPS antenna and SATPS receiver/processor that receive signals from two or more SATPS satellites and process these signals to partly or fully determine the position of the SATPS antenna. The first and second SATPS antenna and associated SATPS receiver/processor may be retrofitted within first and second housings, respectively, that contain conventional first and second electro-optical survey instruments, respectively, used to determine the bearing, length of, and/or height difference of a separation vector joining the two electro-optical survey instruments.

The invention uses certain electro-optical survey measurements, implemented by use of one or more: signal retro-reflectors that operate in the microwave, infrared, visible or ultraviolet wavelength ranges, to determine the bearing, length of, and/or height difference of a separation vector joining the first and second stations. This requires that the two stations have line-of-sight visual contact. The primary object is to implement carder phase positioning (accurate to within a few centimeters), or the less accurate code phase positioning, using the SATPS satellite signals. Carrier phase positioning is implemented by causing two or more SATPS stations track a common group of SATPS satellites. The measurements are then merged and either processed in real time, or post-processed, to obtain data useful in determination of the location of any stationary or mobile SATPS station adjacent to an SATPS reference station. Real time positioning requires transfer of SATPS data between a reference station and a mobile station, using a data link that need not rely upon line-of-sight communication.

One problem that must be overcome initially in use of carrier phase positioning is the presence of phase integer ambiguities in the carrier phase measurements for the tracked satellites. An integer search technique for identification of the phase integers often takes account of the statistical nature of discrete integer combinations that are realistic candidates for the proper phase integers. The number of possible combinations to be searched is enormous, unless the number of candidates can be reduced ab initio. If the relative location of two SATPS stations is known precisely, the number of initial phase integer combination candidates can be reduced to as few as one. If the horizontal or vertical separation distance between the two stations is known with high accuracy in the SATPS frame, the number of phase integer combination candidates can be reduced to a modest number that can be searched relatively quickly and can reliably produce the correct results. The number of phase integer combination candidates is reduced by sequentially applying position information provided by the electro-optical survey measurements Another serious problem with carrier phase positioning is the possibility of SATPS signal interruptions at one or both SATPS stations. When a SATPS satellite signal is lost, the phase integer(s) must be redetermined. Signal interruption can easily occur in urban or other built-up areas where tall structures interfere with or produce multipath SATPS signals. A separation vector between two SATPS stations, specified by three coordinate differences, or by a vector magnitude and two or more spherical angles relative to a fixed direction, may be known initially. However, one or both of these stations may have moved when the signal is interrupted so that the separation vector must be established again.

The invention provides a separation vector, between the two stations by use of one or more wave retro-directors that are mounted on the second station and facing the first station. An electromagnetic wave beam ("light beam") is directed from the first station toward the second station, and the beam is retro-reflected from the second station toward the first station. The station-to-station separation vector is obtained by electro-optical phase measurement techniques. Once the separation vector is re-established, after an SATPS signal interruption occurs, the phase integer combination for the two station is promptly redetermined, and static or kinematic surveying can continue.

Several benefits accrue from this total station approach: (1) rapid azimuthal angle determinations can be made; (2) use of differential SATPS information supplements and improves the accuracy of the survey parameters that can be measured; (3) SATPS signal processing can be done at the reference station or at the mobile station; (4) where the frequency of the station-to-station data link is selected appropriately, or where one or more signal repeaters are used to relay signals between the two stations, survey measurements are not limited to line-of-sight measurements from reference station to a mobile station, once the phase integer ambiguities are resolved; and (5) systematic and random errors in the SATPS and electro-optical measurements can be determined and reduced by combining the information from the two systems.

DESCRIPTION OF BEST MODE OF THE INVENTION

Figure 1:
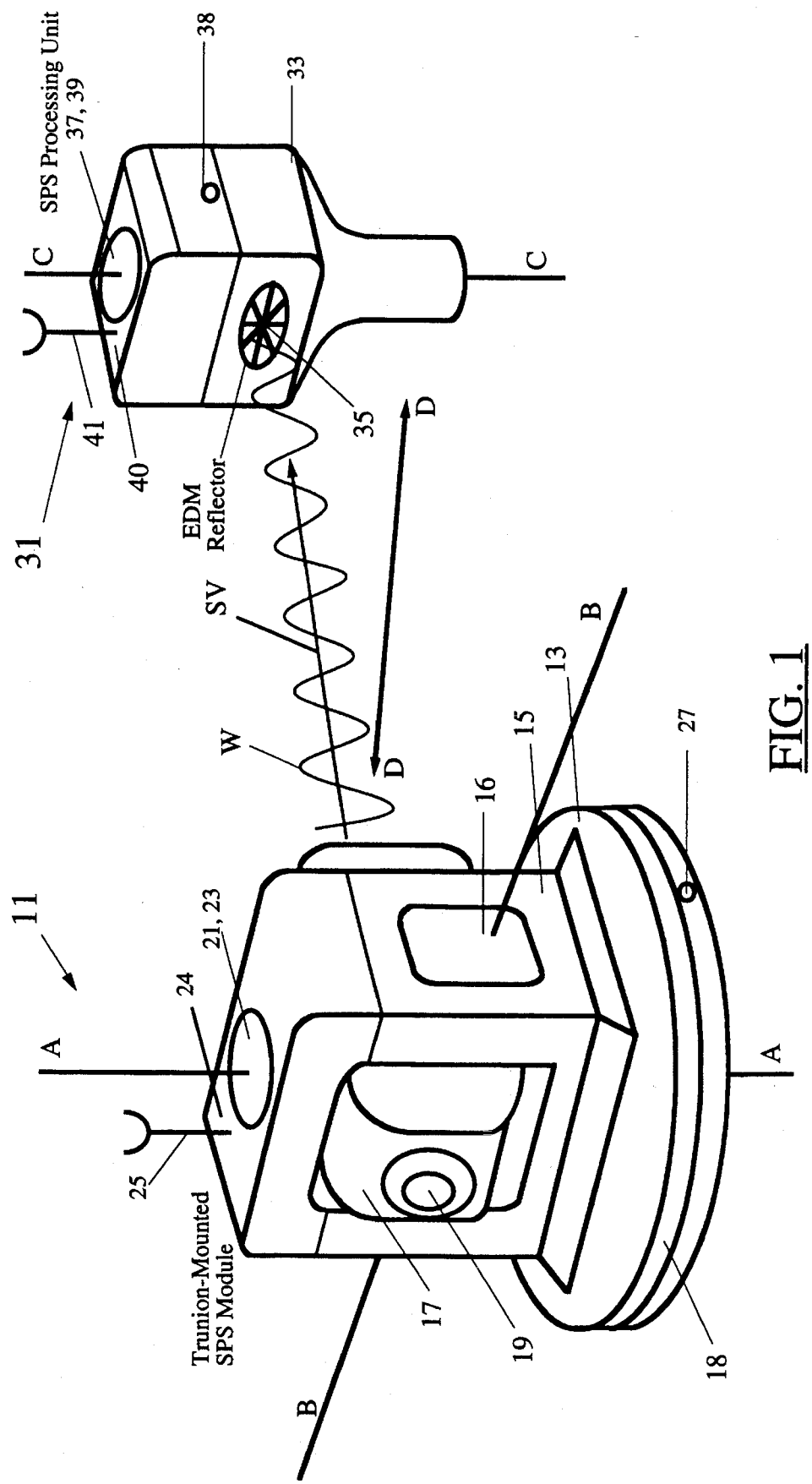
FIG. 1 is a perspective view of one embodiment of the components used for the reference station and mobile station according to the invention.

FIG. 1 illustrates many of the components included in a reference station 11 and a mobile station 31 according to one embodiment of the invention. The reference station 11 includes a plate 13 mounted on a tripod or other stable structure (not shown) and rotatable about an approximately vertical first axis AA that passes through the plate 13. A second body 15, referred to as the alidade, is mounted on a top surface of the plate 13 and is either rotatable about the first axis AA with respect to the plate 13 or rotates with the plate 13 about the first axis AA. A third body 17 is positioned adjacent to or surrounded by the alidade 15 and rotates about an approximately horizontal second axis BB, referred to as the trunnion or horizontal axis, with respect to the alidade 15. The third body 17 includes an EDM 19 that may be aimed or pointed in an arbitrary direction (over a hemisphere with included solid angle approximately $2\pi$ steradians) with the aid of rotations of the first, second and third bodies about the first and second axes AA and BB. In one embodiment, the EDM 19 relies upon electro-optical principles and emits electromagnetic waves W with a fixed wavelength $\lambda$ that is known to high accuracy. The waves W are reflected at, or otherwise interact with, the mobile station 31, and a return signal from the mobile station is used to determine the distance from the reference station 11 to the mobile station 31.

The reference station 11 determines the horizontal or azimuthal angle $\theta_h$ of a reference station orientation line DD in the local horizontal plane with respect to a fixed reference line RR (shown in FIG. 6 for improved clarity), such as true north. The reference station 11 also determines the vertical or polar angle $\theta_v$ between the horizontal line DD and a separation vector SV (of length d) that joins the reference station and the mobile station 31.

The reference station 11 further includes an SATPS signal antenna 21, which may form part of a handle or other structure for the instrument 11, that receives SATPS signals from two or more satellites that are part of a Satellite Positioning System. The SATPS signals received by the SATPS antenna 21 are passed to an SATPS receiver/processor 23 that analyzes these signals and determines the location of the antenna. The SATPS signal receiver/processor 23 (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System*, Van Nostrand Reinhold, 1992, pp. 33–90, incorporated by reference herein.

The reference station 11 also includes a first station communication means, including a first transmitter, receiver or transceiver 24 and first communications antenna 25, for transmitting information to and/or receiving information from the mobile station 31, and a common data output port 27.

The mobile station 31 includes a fourth body 33 that is mounted on a tripod, prism pole or other stable structure (not shown) and is rotatable about an approximately vertical third axis CC. Normally, the axes AA and CC are each aligned to the local gravitational force vector so that AA and CC are parallel to each other only for very small separations between the reference station 11 and the mobile station 31. The fourth body 33 includes an EDM responder 35 that responds to incident electromagnetic waves, such as W, and produces a return signal that is received and understood by the EDM 19. The EDM 19 and the EDM responder 3:5 work cooperatively to determine the distance or range from the reference station 11 to the mobile station 31 and/or an angle between the station separation vector SV and a selected reference line, such as a true north line passing through the reference station. The azimuthal angle (horizontal) and polar angle (vertical) for the separation vector SV are determined using an optical encoder that is included in the digital theodolite.

The mobile station 31 also includes a second SATPS signal antenna 37 and a second SATPS signal receiver/processor 39, connected together, that also receive SATPS signals from two or more SATPS satellites and determine the location of the second SATPS antenna from these SATPS signals. The mobile station 31 may include a common data output port 38 for first or second station location information.

The mobile station 31 also includes a second transmitter, receiver or transceiver 40 and second communications antenna 41 that allows communication between the reference station 11 and the mobile station 31. In one mode of operation of the system shown in FIG. 1, the reference station 11 receives SATPS signals, makes code phase and/or carrier phase measurements, compares the location of the reference station indicated by these signals with the location of the reference station that is known with high accuracy from another source, and transmits location correction information to the mobile station 31. This information may include the unprocessed code phase and/or carrier phase information plus corrections to the SATPS-determined reference station location, based upon the known reference station location.

The reference station 11 determines the difference in three location spatial coordinates and/or a local time coordinate and transmits these coordinate differences to the mobile station, using the first and second communications antennas 25 and 41. The mobile station 31 then uses the reference station measurements and mobile station location information, plus the local SATPS measurements, to accurately determine the location of the second SATPS antenna 37 relative to the location of the first SATPS antenna 21.

Alternatively, in a second mode of operation, the mobile station 31 transmits its SATPS-determined location carrier wave attribute or pseudorange attribute and/or time coordinates and height of instrument and relevant status information (such as meteorological data and remaining battery charge) to the reference station 11, using the first and second communications antennas 25 and 41. The first SATPS receiver/processor 23 receives these coordinates and corrects the coordinates for the second SATPS antenna 37, using the measurements for the first SATPS antenna 21.

In a third mode of operation, the reference station 11 receives SATPS data from a remote station (not shown in FIG. 1) whose location is precisely known in a geodetic reference frame. The reference station 11 uses this information to precisely determine its own location and the location of the mobile station 31 in the desired reference frame.

Figure 2:
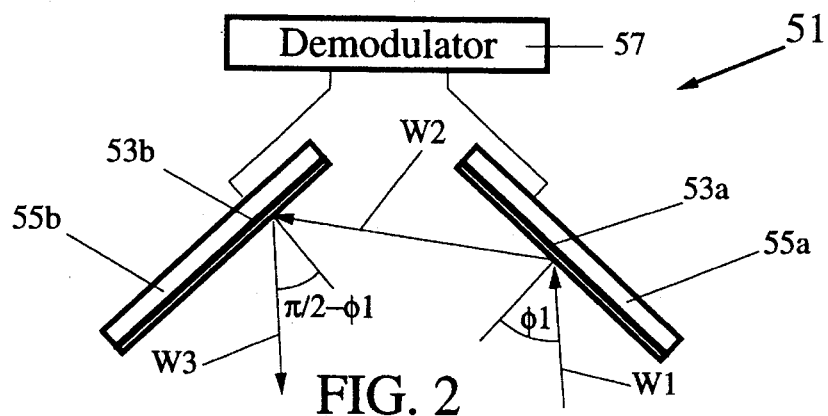
FIG. 2 is a schematic view of a retro-reflector used at the mobile station or the reference station according to one embodiment of the invention.

FIG. 2 illustrates one suitable EDM responder 35 for the mobile station 31 in FIG. 1, an electromagnetic wave retro-reflector 51 that includes two highly reflective surfaces 53a and 53b that are oriented perpendicularly to each other. Alternatively, the retro-reflector 51 may include an array of antenna components 53a and 53b that receives an incident electromagnetic wave at a microwave or infrared frequency and produces a retro-directed wave that proceeds away from the retro-reflector 51 in the opposite direction, as illustrated in U.S. Pat. No. 4,985,707, issued to Schmidt and Kadim, incorporated by reference herein.

An incident electromagnetic wave W1 approaches the first surface/array 53a at an arbitrary incidence angle $\phi 1$, is reflected as a wave W2 that approaches the second surface/array 53b, and is reflected by this second surface/array as a wave W3 at a reflectance angle $\pi/2-\phi 1$. The wave W3 thus moves away from the retro-reflector 51 in the same direction as, but oppositely directed to, the direction of approach of the incident wave W1. The incident wave W1 is thus returned toward the EDM 19 in FIG. 1 as an anti-parallel wave W3. The EDM responder 35 in FIG. 1 may be an optical retro-reflector of well known design if the incident electromagnetic wave W1 has a wavelength that lies in the near-infrared, visible or ultraviolet range. If the incident wave W1 has a far-infrared or microwave or longer wavelength, the EDM responder 35 may be an array of antenna elements for retro-direction of the incident wave, as indicated above.

Figure 3A:
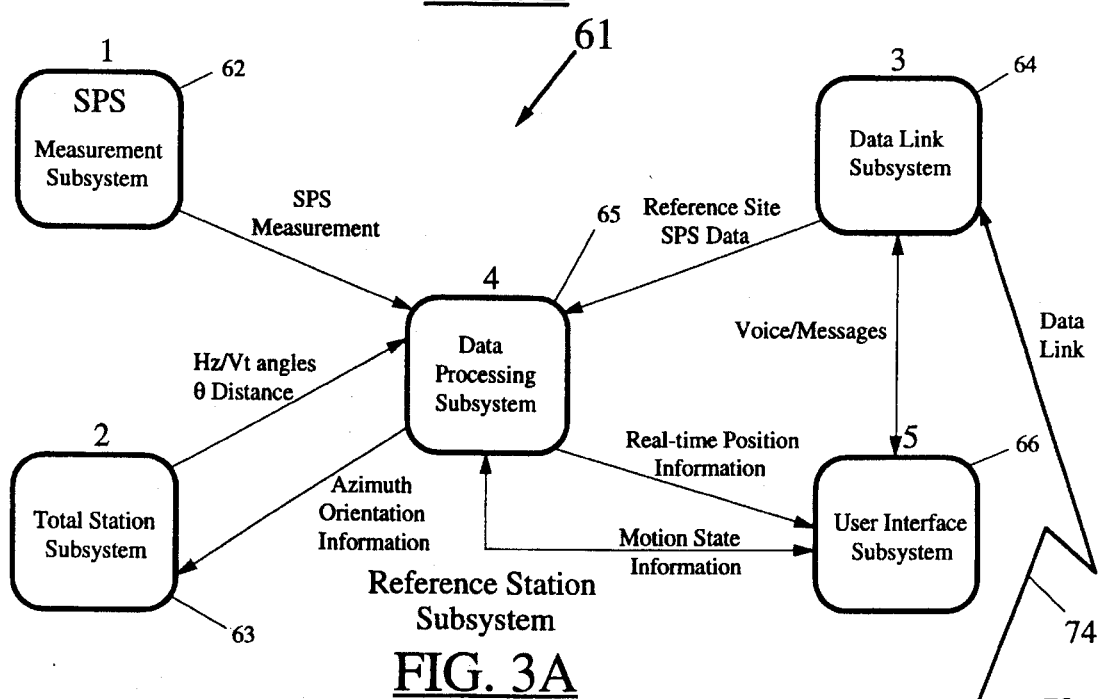
FIGS. 3A and 3B together provide a schematic view of a signal processing system used for the reference station and for the mobile station according to one embodiment of the invention.
Figure 3B:
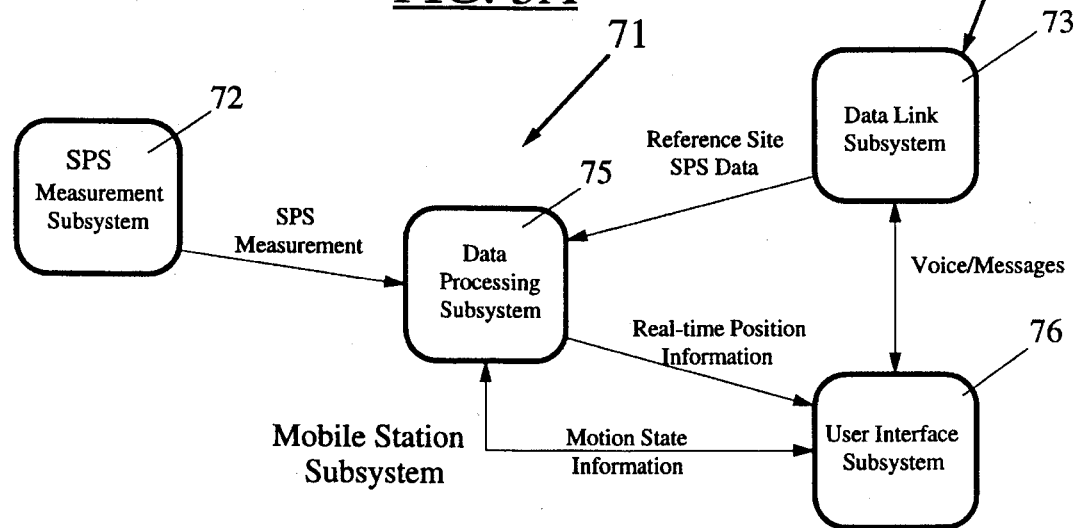

FIGS. 3A and 3B illustrate one embodiment of the system 61 of the reference station 11 and of the system 71 of the mobile station 31, respectively. The reference station system 61 includes: (1) an SATPS measurement subsystem 62 that receives SATPS satellite signals and computes or otherwise determines or computes the SATPS-determined location of the first SATPS antenna 21 (FIG. 1); (2) a total station subsystem 63 that includes the EDM 19 and provides horizontal and/or vertical distance and/or angular displacement information and/or azimuthal displacement information for the mobile station 31 relative to the reference station 11; (3) a data link subsystem 64 that receives SATPS location information from and/or transmits SATPS location information from the mobile station 31; (4) a data processing subsystem 65 that receives information from the subsystems 62, 63 and/or 64 and provides information on the location of the mobile station 31 relative to the reference station 11; and (5) a user interface subsystem 66 that receives information from the data processing subsystem 65 and displays and stores this information in a useful format or formats for a person performing survey activities at the reference station 11.

The mobile station system 71 shown in FIG. 3 includes:

(1) an SATPS measurement subsystem 72 that receives SATPS satellite signals, makes carrier phase and code phase measurements, and determines the SATPS-determined location of the second SATPS antenna 37 (FIG. 1); (2) a data link subsystem 73 that receives SATPS location information from and/or transmits SATPS location information from the reference station 11; (3) a voice message and/or data link 74 (optional) that connects the reference station data link subsystem 64 with the mobile station data link subsystem 73 and allows the operators at the two stations to communicate with each other; (4) a data processing subsystem 75 that receives information from the subsystems 72 and/or 73 and/or 76 and provides information on the location of the mobile station 31; and (5) a user interface subsystem 76 that receives information from the data processing subsystem 75 and displays and stores this information in a useful format or formats for a person performing survey activities at the mobile station 31.

The data link element 73 shown in FIG. 3B may be implemented in several ways. A first implementation introduces modulation into the optical wave or radiowave W used for sighting of the mobile station 31 from the reference station 11 (FIG. 1). With reference to FIG. 2, if the wave W1 is optical, the reflecting surfaces 53a and 53b are provided with electrically sensitive backings 55a and 55b, respectively, that sense these modulations on the optical wave W1 and transfer these sensed modulation signals to a signal demodulator 57 that demodulates and determines the content of these signals. Because the incident wave W1 and first reflected wave W2 will be intercepted by the respective reflectors 53a and 53b, each of the two sensitive backing layers 55a and 55b should sense substantially the same modulated signal; and either or both of these sensed modulation signals can be used by the demodulator 57. As one alternative, the modulation signals sensed by the sensitive backing layer 55b can be used as an error check for the modulation signals sensed by the sensitive backing layer 55a. If the wave W1 is a radiowave, the modulations introduced into the wave W1 can be sensed by one or more of the antenna elements in the retro-directing antenna array and, again, demodulated by a signal demodulator.

A second implementation of the data link 73 shown in FIG. 3B uses a radio link established by the antennas 25 and 41 and associated transmitters and receivers 24 and 40, as illustrated in FIG. 1. This data link has the advantage that the link can provide one-way or two-way communication between the reference station 11 and the mobile station 31.

At least three approaches can be adopted for data receipt and processing in the embodiment shown in FIGS. 3A and 3B. In a first approach, the mobile station system 71 receives the SATPS signals (including satellite attributes information) through its SATPS measurement subsystem 72 and transmits these signals to the reference station system 61, where the SATPS-determined locations of the reference station and of the mobile station are computed, the reference station location correction (=known reference station location−SATPS-determined reference station location) is computed, and the SATPS-determined mobile station location is corrected using the reference station location correction. In this approach, the data processing subsystem 75 and the user interface subsystem 76 in the mobile station system 71 are optional and can be deleted.

In a second approach, the reference station system 61 receives the SATPS signals through its SATPS measurement subsystem 62 and transmits these signals to the mobile station system 71, where the SATPS-determined locations of the reference station and of the mobile station are computed, the reference station location correction is computed, and the SATPS-determined mobile station location is corrected using the reference station location correction. The known location of the reference station can be transmitted from the reference station to the mobile station, or this known location information can be stored in the SATPS measurement subsystem 72 or the data processing subsystem 75 of the mobile station system 71. In this approach, the data processing subsystem 65 and the user interface subsystem 66 in the reference station system 61 are optional and can be deleted.

In a third approach, the mobile station system 71 receives the SATPS signals through its SATPS measurement subsystem 72, determines the mobile station location, and transmits the SATPS-determined mobile station location information to the reference station system 61. At the reference station system 61, the SATPS-determined reference station location is computed, the reference station location correction is computed, and the SATPS-determined mobile station location is corrected using the reference station location correction. In this approach, the user interface subsystem 76 in the mobile station system 71 is optional and can be deleted.

Figure 4A:
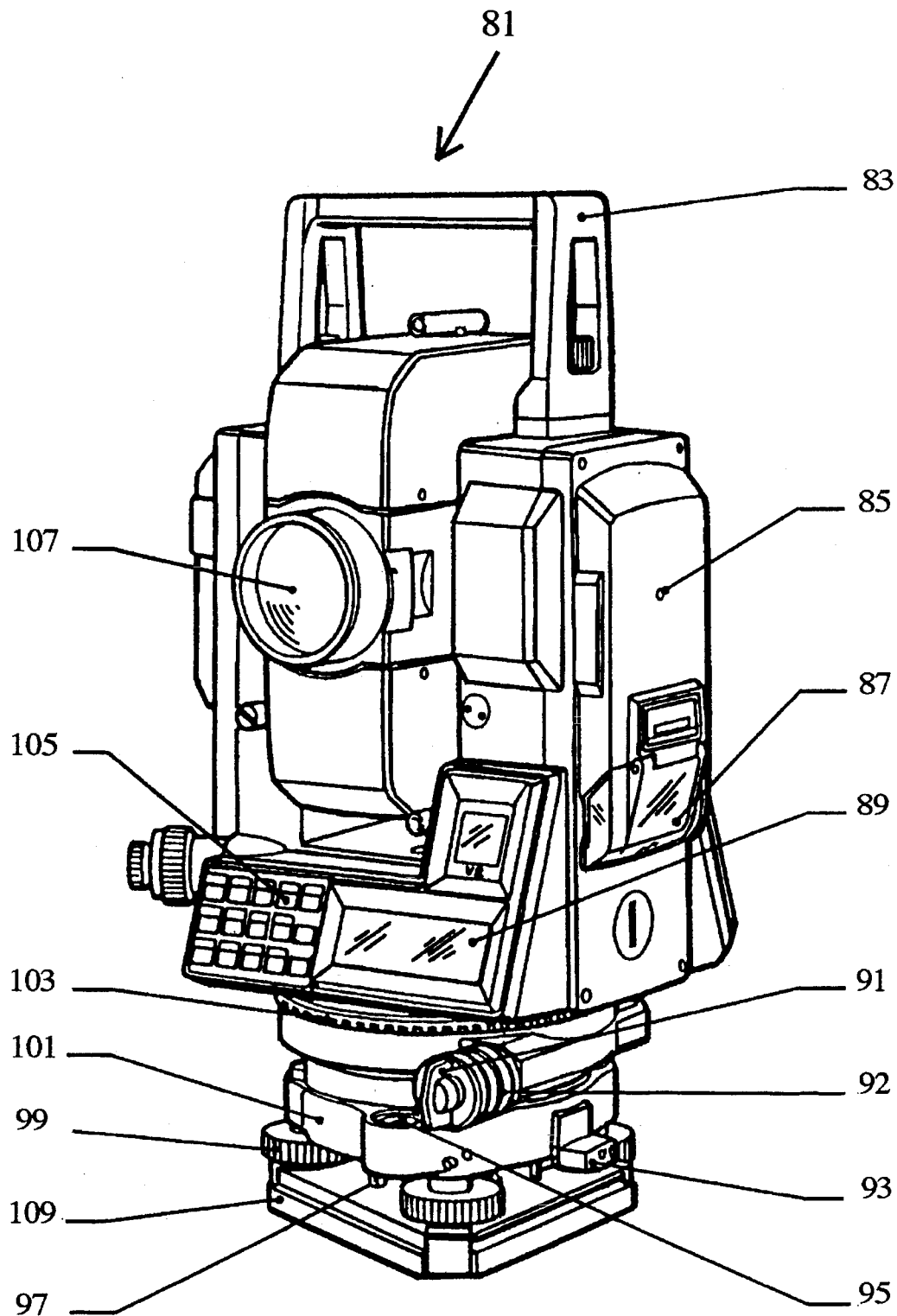
FIGS. 4A and 4B are front and back perspective views of a conventional electro-optical instrument that determines the horizontal bearing, vertical angle and length of a vector joining this instrument with a second instrument that responds to receipt of an electromagnetic wave from the first instrument by returning a signal to the first instrument.
Figure 4B:
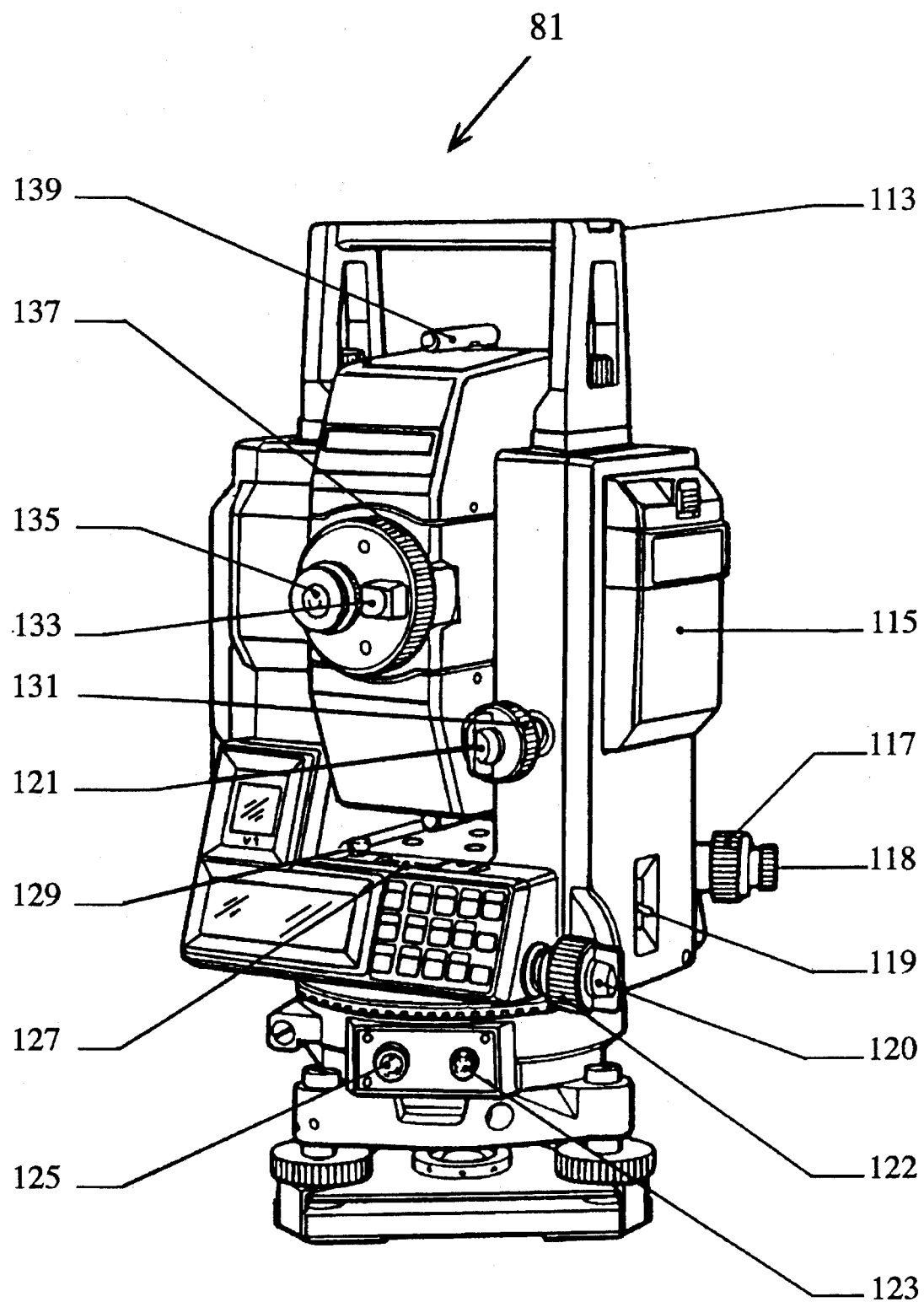

FIGS. 4A and 4B are front and back views, respectively, of a representative conventional electronic total station 81 from the prior art. The front view in FIG. 4A illustrates a carrying handle 83, instrument height mark 85, electronic memory card and cover 87, alphanumeric display 89, clamps 91 and 93, circular level 95 with associated level adjusting screws 97, level adjusting foot screws 99, Tribach 101, horizontal circle positioning ring 103, keyboard 105 for data and instruction entries, an objective lens 107 for survey line-of-sight positioning, and a base plate 109. The back view (operator side) of the station 81 in FIG. 4B illustrates a slot for a tubular compass 113 in the handle 83, a battery or other power supply 115, an optical plummet focusing ring 117 and focusing eyepiece 118, a power switch 119, a horizontal clamp 120, a vertical clamp 121, a horizontal fine motion adjustment screw 122, a data output electronic connector 123, an external power supply connector 125, a horizontal plate level 127 and adjusting screw 129, a vertical fine motion adjustment screw 131, a telescope transitting knob 133, a telescope eyepiece 135 (connected with the objective lens 107 in FIG. 4A), a telescope focussing ring 137, and a peep sight 139 for further viewing of a scene in which a survey measurement will be made.

Figure 5:
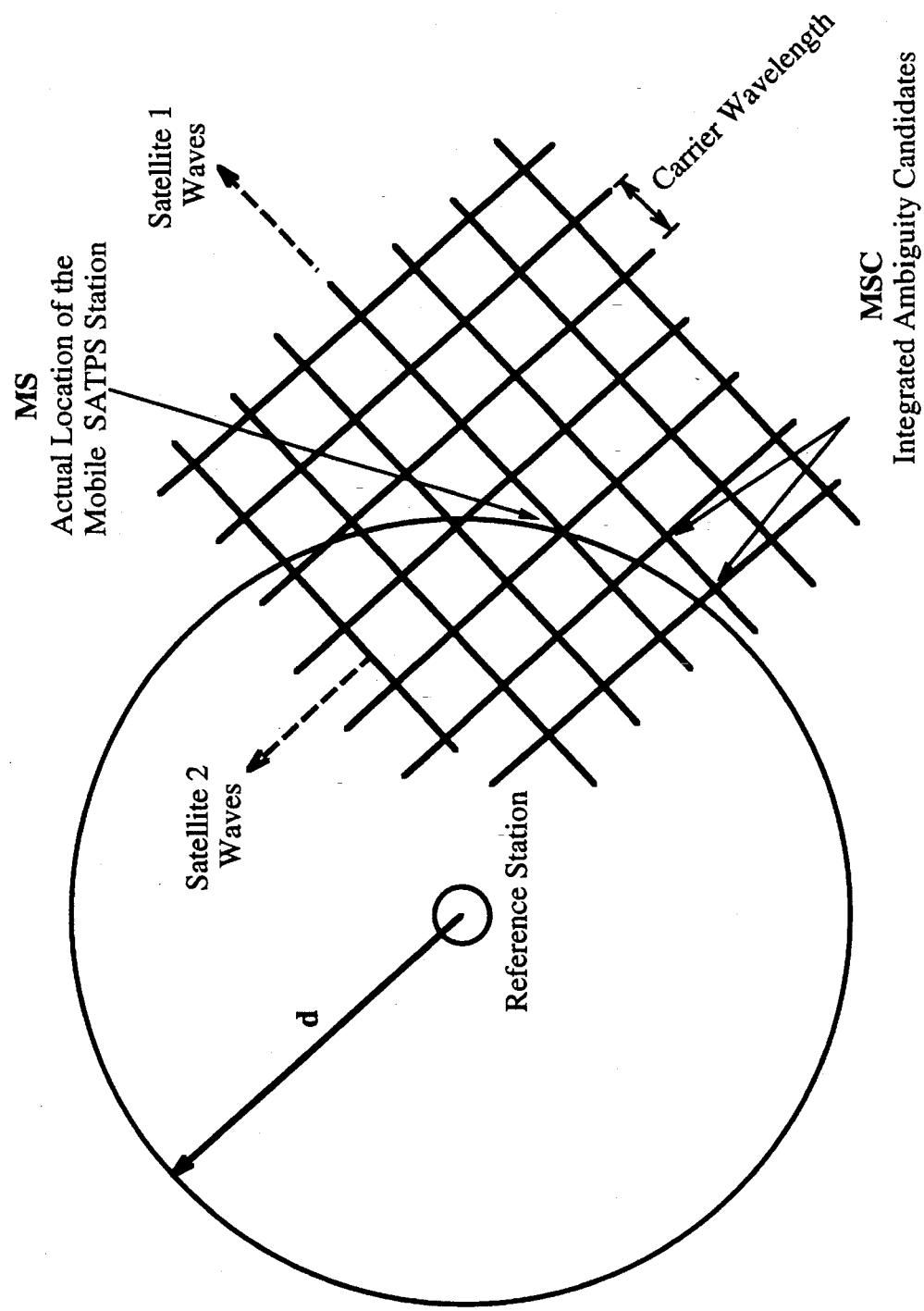
FIG. 5 illustrates how phase integer ambiguities occur in an SATPS.

SATPS carrier phase measurements contain an integer phase ambiguity that must be resolved to obtain centimeter-level accuracies on station location. FIG. 5 illustrates two intersecting wavefront sequences arising from carrier waves received from two SATPS satellites, the actual location MS of a mobile station antenna 37, and several adjacent other candidates MSC for the mobile station location. An EDM and digital reading of vertical slope between the reference and mobile stations provides valuable information for resolution of these integer phase ambiguities. The known distance d shown in FIG. 6 between the reference station antenna 21 and the mobile station antenna 37 limits the integer search region for the integer phase ambiguities to a sphere of radius d. In practice the distance d will be known only within a small uncertainty $\pm\Delta d$, and the search region becomes a volume between two concentric spheres of radius $d \pm \Delta d$.

Figure 6:
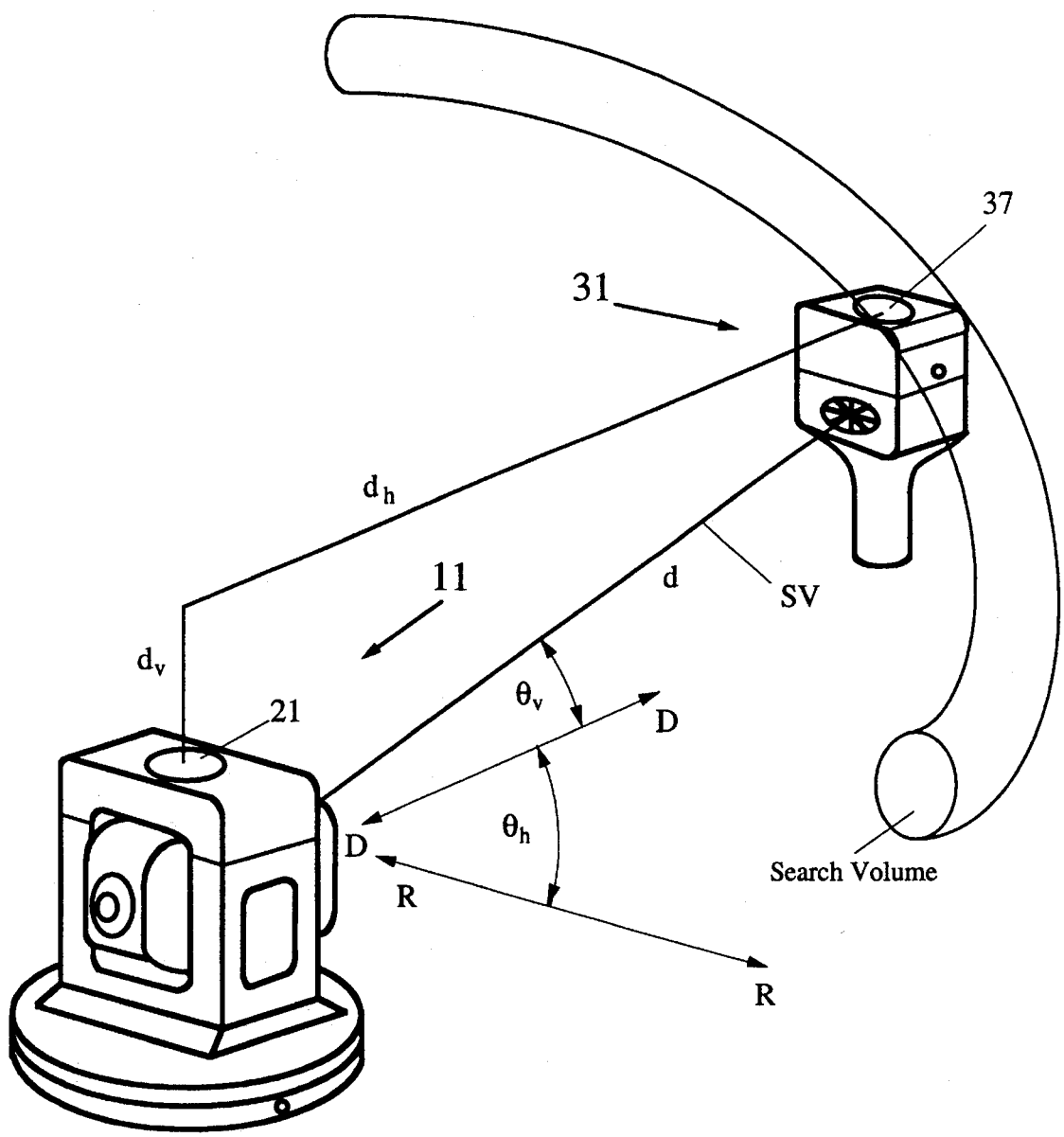
FIGS. 6 and 7 illustrate reductions in search volume for the correct carrier phase integers that are available with the invention in two approaches.

The search region is further reduced by applying the known height difference $d_v$ between the two antennas 21 and 37, which is determined from knowledge of the distance d and the vertical angle $\theta_v$ relative to a horizontal line DD in FIG. 6. In practice, the vertical angle $\theta_v$ will have a small uncertainty $\pm\Delta\theta_v$ associated with it. The search can now be limited to an annular region defined by intersection of the two concentric spheres of radius $d\pm\Delta d$ and the region between two cones having a common apex at the reference station antenna 21 and apex angles equal to $\pi/2-(\theta_v\pm\Delta\theta_v)$. An angular displacement $\theta_h$ between a reference line RR and the line DD can used to re-establish lost satellite lock.

Figure 7:
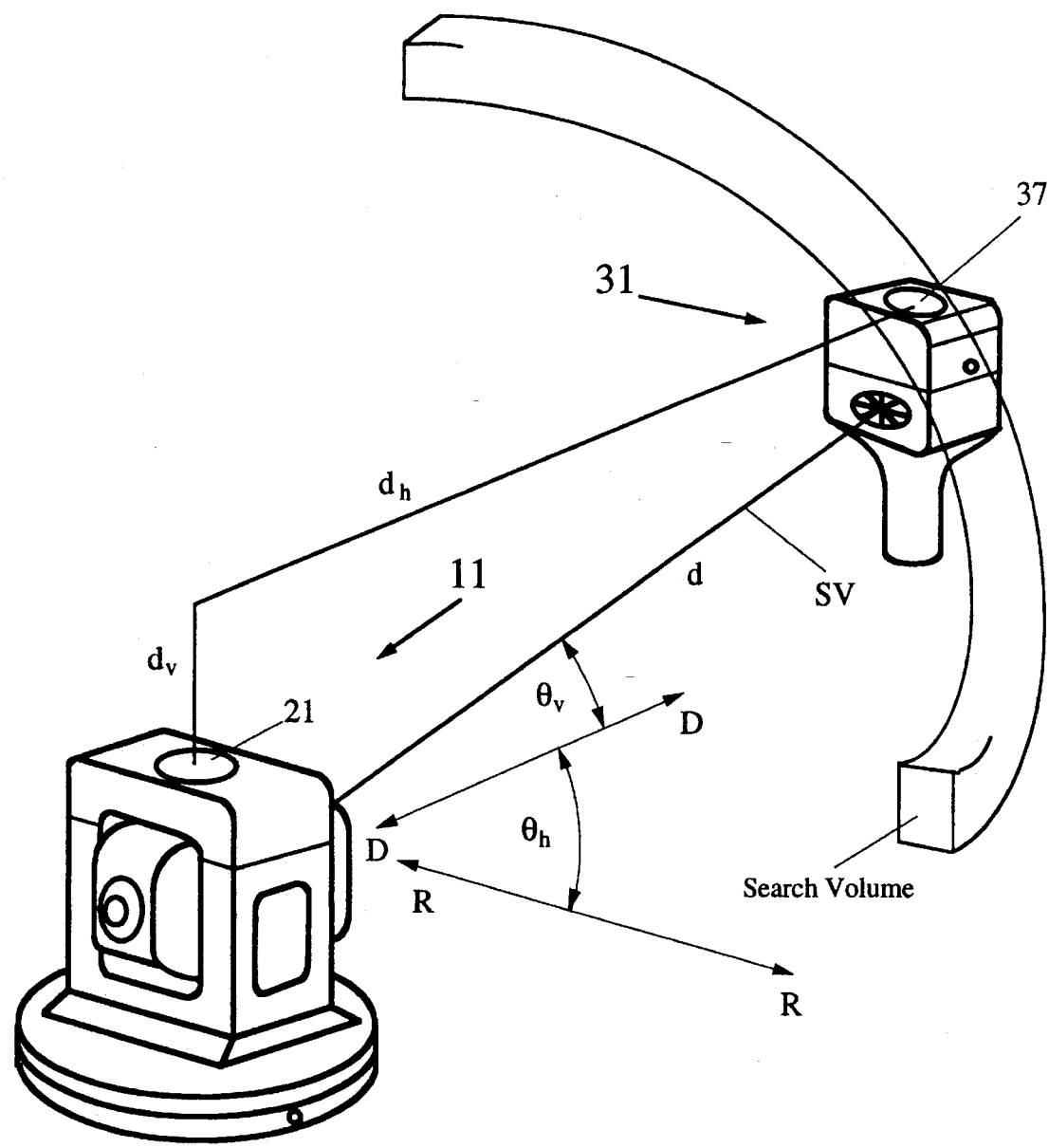

The height difference between the reference and mobile stations 11 and 31 are related to the geoid, while the SATPS measurements are related to a fixed ellipsoidal reference system. Unless the coordinate differences between the geoid system and this reference system have been determined beforehand, the antenna height difference $d_v$ must also take account of the uncertainties, if any, in the geoid-ellipsoid reference systems. As long as the separation distance d is small ($\leq 10$ km), the geoid-ellipsoid height difference should be no more than a few centimeters in reasonably flat terrain. The integer search region might be approximated by an ellipsoid, as in FIG. 6, or by a curvilinear parallelepiped, as in FIG. 7.

Further reduction in the integer search region may be realized by taking advantage of the available differential SATPS code measurements, which provide an unambiguous estimate of the mobile station location relative to the reference station, with an inaccuracy of no more than about five meters. The accuracy of the code-based location solution governs the resulting size of the integer search region, which is now reduced to a sector of the ellipse of revolution, as illustrated in FIG. 6. Only those carrier phase integer ambiguity combinations that fall within the sector indicated in FIG. 6 are considered as candidates. The integer combination with the smallest dispersion is preferably chosen as the correct combination. If the correct integer combination is not immediately apparent from a single measurement epoch, additional satellite geometries over the course of time may be used to average out errors and to further eliminate incorrect integer combinations.

One of the first references to discuss ambiguity resolution techniques in a GPS context is Counselman and Gourevitch, "Miniature Interferometer Terminals for Earth Surveying: Ambiguity and Multipath with Global Positioning System", I.E.E.E. Trans. on Geoscience and Remote Sensing, vol. GE-19 (1981) pp.24414 252, incorporated herein by reference. The published search algorithms rely on a statistical measure of the quality of different ambiguity integer combinations, in order to identify the correct ambiguities for the tracked satellites.

Some computational efficiencies have been incorporated in integer search algorithms disclosed by Hatch in U.S. Pat. Nos. 4,963,889 and 5,072,227, and by Euler and Landau in "Fast GPS Ambiguity Resolutions On-the-fly for Real-time Applications", Sixth International Geodetic Symposium on Satellite Positioning, Columbus Ohio, 17–20 March 1992, incorporated by reference herein. Search techniques for ambiguity integers have also been disclosed where the distance between two SATPS receivers (e.g., at reference and mobile stations) is known. The Hatch patents, U.S. Pat. No. 5,101,356, issued to Timothy et al, and U.S. Pat. No. 5,148,179, issued to Allison, incorporated by reference herein, discuss other techniques for resolution of integer ambiguities. The capability of tightly constraining the integer ambiguity search based upon height difference and separation distance of two SATPS antennas is particularly valuable here. Thus, several techniques exist for resolution of integer ambiguities, and such techniques can be applied here in performing carrier-phase positioning in the context of this invention.

An SATPS antenna, receiver/processor and other appropriate equipment can be retrofitted to, and even integrated into the housing for, the conventional electronic total station 81 shown in FIGS. 4A and 4B. For example, an SATPS antenna 21 of appropriate design and SATPS receiver/processor 23 can be incorporated in the top of the handle 83 in FIG. 4A, as suggested in FIG. 1. Alternatively, the SATPS receiver/processor can be positioned i 15 of FIG. 1 at any convenient place therein. A second antenna 25 and transceiver 24 for the reference station 11 and a second antenna 41 and transceiver 40 for the mobile station 31 can be positioned at any convenient places on those stations, for communicating with each other. Preferably, the SATPS components and related communications components 21, 23, 24 and 25 on the reference station 11 should share a common data port and a common power supply connector with the other reference station components; and the SATPS components and related communications components 37, 39, 40 and 41 for the mobile station 31 should share a common data port and a common power supply connector with the other mobile station components.

A configuration of two or more receivers can be used to accurately determine the relative positions between two stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

This invention herein relies upon a combination of differential satellite positioning system (DSATPS) and electro-optical distance and angle measurements to provide highly accurate position information on the location of one or more mobile stations relative to a reference station whose location is known or determined with high accuracy.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=154 f0 and f2=120 f0, using a base frequency f0=10.23 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\propto f^{-2}$). This phenomenon is discussed by MacDoran in U.S. Pat. No. 4,463,357, which discussion is incorporated by reference herein. When transit time delay through the ionosphere is determined, a phase difference associated with a given carrier signal can be determined.

Use of the PRN codes allows, use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0/10=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7,000 days) before this code portion repeats. Accepted methods for generating the C/A-code and P-code are set forth in the document GPS Interface Control Document ICD-GPS-200, published by Rockwell International Corporation, Satellite Systems Division, Revision A, 26 Sep. 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, incorporated by reference herein.

A second configuration for global positioning is the Global Orbiting Navigation Satellite System (GLONASS), placed in orbit by the former Soviet Union and presumed to be maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+ 9k/16) GHz and f2=(1.246+7k/16) GHz, where k (=0, 1, 2, ..., 23) is the channel or satellite number. These frequencies lie in two bands at 1.597–1.617 GHz (L1)and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention. A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

We claim:

1. Apparatus for improved accuracy in measuring survey parameters, the apparatus comprising:

a first station, having an axis that is locally vertical, that provides a reference for the survey and whose location is known with high accuracy, the first station comprising:

a first Satellite Positioning System (SATPS) antenna and first SATPS receiver/processor, connected together, for receiving SATPS signals from two or more SATPS satellites and for determining the location of the first station according to the SATPS signals, the first SATPS receiver/processor also being adapted for determining a first station location difference, if any, between the known location of the first station and the location of the first station as determined by the SATPS signals;

a first station communications means, connected to the first SATPS receiver/processor, for transmitting or receiving information on station location and on SATPS satellite attributes; and distance measurement means, whose spatial orientation can be varied arbitrarily, connected to the first SATPS receiver/processor, for transmitting an electromagnetic signal including a selected wavelength, for determining the distance from the first station to a selected object that is spaced apart from the first station by receipt of a return electromagnetic signal from the object, for determining an elevation difference, if any, between the first station and the object, and for determining an angular displacement, if any, between a line drawn from the first station to the object and a selected reference line lying in a plane containing the first station; and a second station, having an axis that is locally vertical, that is spaced apart from and movable relative to the first station and acts as a mobile measurement unit for the survey, the second station comprising:

a second SATPS antenna and :second SATPS receiver/processor, connected together, for receiving SATPS signals from two or more SATPS satellites and for determining the location of the second station according to the SATPS signals;

a second station communications means, connected to the second SATPS receiver/processor, for communicating with the first station communications means and for transmitting or receiving information on station location and satellite attributes as determined by the SATPS satellite signals; and distance measurement responder means, for receiving the electromagnetic waves transmitted by the distance measurement means and for providing a return electromagnetic signal that is received by the distance measurement means;

where at least one of the first SATPS receiver/processor and the second SATPS receiver/processor uses the first station location difference to correct or increase the accuracy of the SATPS-determined location of the second station.

2. Apparatus according to claim 1, wherein said distance measurement responder means includes at least one electromagnetic wave retro-reflector that receives an electromagnetic wave from said first station and transmits this wave toward said first station in a direction approximately parallel to the direction from which the wave was received from said first station.

3. Apparatus according to claim 1, wherein said first station includes a handle by which said first station can be held and transported, and said first SATPS antenna is positioned in this handle.

4. Apparatus according to claim 1, wherein said second station includes a handle by which said second station can be held and transported, and said second SATPS antenna is positioned in this handle.

5. The apparatus of claim 1, wherein said first SATPS antenna has an axis that is approximately parallel to said first station vertical axis.

6. The apparatus of claim 1, wherein said second SATPS antenna has an axis that is approximately parallel to said second station vertical axis.

7. The apparatus of claim 1, wherein said first station further comprises a data output terminal, connected to at least one of said electronic distance meter or said first SATPS receiver/processor, to provide an output signal containing information on at least one of the following: (1) said location of said first station, as determined by said SATPS signals; (2) said known, location of said first station; (3) said difference between said known location and said SATPS-determined location of said first station; (4) said distance from said first station to said selected object; (5) said elevation difference between said first station and said selected object; and (6) said angular displacement between said selected reference line and said line drawn from said first station to said selected object.

8. The apparatus of claim 1, wherein said second station communications means receives from said first station communications means, information on said first station location difference and uses this received information to correct or increase the accuracy of said SATPS-determined location of said second station.

9. The apparatus of claim 1, wherein said first station communications means receives from said second station communications means, information on said SATPS-determined location of said second station and uses said information on said first station location difference to correct or increase the accuracy of said SATPS-determined location of said second station.

10. The apparatus of claim 1, wherein said SATPS signals received by said first SATPS antenna and receiver/processor and by said second SATPS antenna and receiver/processor are carrier phase signals.

11. Apparatus for improved accuracy in measuring survey parameters, the apparatus comprising:

a first station, having an axis that is locally vertical, that provides a reference for the survey and whose location is known with high accuracy, the first station comprising:

a first SATPS measurement subsystem for a Satellite Positioning System for receiving SATPS signals from two or more SATPS satellites and for determining the location of the first station according to the SATPS signals;

a first station measurement subsystem, having a spatial orientation that can be varied arbitrarily and being connected to the first SATPS measurement subsystem, for transmitting an electromagnetic signal including a selected wavelength to a selected object that is spaced apart from the first station, for determining an object distance from the first station to the selected object by receipt of a return electromagnetic signal from the object, for determining an object elevation difference, if any, between the first station and the object, and for determining an angular displacement, if any, between a line drawn between the first station and the object and a selected reference line lying in a plane containing the first station;

a first data processing subsystem, for receiving signals from the first SATPS measurement subsystem and from the first station measurement subsystem, and for determining a first station location difference, if any, between the known location of the first station and the location of the first station as determined by the SATPS satellite signals;

a first station communications subsystem, connected to the first SATPS measurement subsystem, for transmitting information concerning first station location, SATPS satellites attributes, and the first station location difference; and a first user interface subsystem, for receiving information from the first data processing subsystem, and for displaying the known location of the first station; and a second station, having an axis that is locally vertical and being spaced apart from and movable relative to the first station, the second station comprising:

a second SATPS measurement subsystem for a Satellite Positioning System, for receiving SATPS signals from two or more SATPS satellites, and for determining the location of the second station according to the SATPS signals;

a second station measurement subsystem, for receiving the electromagnetic signal from the first station measurement subsystem and for providing an electromagnetic return signal to the first station;

a second station communications subsystem for receiving information concerning first station location, SATPS satellites attributes, and the first station location difference from the first station communications subsystem;

a second data processing subsystem for receiving signals from the second SATPS measurement subsystem and from the second station communications subsystem, and for determining a corrected second station location, using the first station location difference and the SATPS-determined second station location; and a second user interface subsystem for receiving information from the second data processing subsystem, and for displaying corrected location of the second station, which is corrected using the first station location difference.

12. Apparatus according to claim 11, wherein said first station measurement subsystem includes distance measurement means for transmitting said electromagnetic signal, for receiving said return electromagnetic signal, and for determining said object distance and said object elevation difference; and wherein said second SATPS measurement subsystem includes distance measurement responder means that includes at least one electromagnetic signal retro-reflector, for receiving an electromagnetic signal from said first station and for reflecting this signal toward said first station in a direction approximately parallel to the direction from which the signal was received from said first station.

13. Apparatus according to claim 11, wherein said first station includes a handle by which said first station can be held and transported, and said first SATPS measurement subsystem includes an SATPS antenna that is positioned in this handle.

14. Apparatus according to claim 11, wherein said second station includes a handle by which said second station can be held and transported, and said second SATPS measurement subsystem includes an SATPS antenna that is positioned in this handle.

15. The apparatus of claim 11, wherein said first SATPS measurement subsystem includes an SATPS antenna having an axis that is approximately parallel to said first station vertical axis.

16. The apparatus of claim 11, wherein said second SATPS measurement subsystem includes an SATPS antenna having an axis that is approximately parallel to said second station vertical axis.

17. The apparatus of claim 11, wherein said SATPS signals received by said first SATPS measurement subsystem and by said second SATPS measurement subsystem are carrier phase signals.

18. Apparatus for improved accuracy in measuring survey parameters, the apparatus comprising:

a first station, having an axis that is locally vertical, that provides a reference location for the survey and whose location is known with high accuracy, the first station comprising:

a first SATPS measurement subsystem for a Satellite Positioning System for receiving SATPS signals from two or more SATPS satellites and for determining the location of the first station according to the SATPS signals;

a first station measurement subsystem, having a spatial orientation that can be varied arbitrarily and being connected to the first SATPS measurement subsystem, for transmitting an electromagnetic signal having a selected wavelength to a selected object spaced apart from the first station, for determining an object distance from the first station to the selected object by receipt of a return electromagnetic signal from the object, for determining an object elevation difference, if any, between the first station and the object, and for determining an angular displacement, if any, between a line drawn from the first station to the object and a selected reference line lying in a plane containing the first station;

a first station communications subsystem, connected to the first SATPS measurement subsystem, for receiving information that determines location of an object spaced apart from the first station and for receiving SATPS satellites attributes;

a data processing subsystem for receiving signals from the first SATPS measurement subsystem, from the first station measurement subsystem and from the first communications subsystem, for determining a first station location difference, if any, between the known location of the first station and the location of the first station as determined by the SATPS satellite signals, and for determining a corrected second station location, using the first station location difference; and a user interface subsystem for receiving information from the first communications subsystem and from the first data processing subsystem, and for displaying at least one of the known location of the first station or the corrected second station location; and a second station, having an axis that is locally vertical and being spaced apart from and movable relative to the first station, the second station comprising:

a second SATPS measurement subsystem for a Satellite Positioning System for receiving SATPS signals from two or more SATPS satellites and for determining the location of the second station according to the SATPS signals;

a second station measurement subsystem, for receiving the electromagnetic signals of the selected wavelength from the first station measurement subsystem and for providing a return electromagnetic signal to the first station; and a second station communications subsystem, connected to the second SATPS measurement subsystem, for transmitting information that determines the second station location and SATPS satellites attributes to the first station communications subsystem.

19. Apparatus according to claim 18, wherein said first station measurement subsystem includes distance measurement means for transmitting said electromagnetic signal, for receiving said return electromagnetic signal, and for determining said object distance and said object elevation difference; and wherein said second SATPS measurement subsystem includes distance measurement responder means that includes at least one electromagnetic signal retro-reflector for receiving an electromagnetic signal from said first station and for reflecting this signal toward said first station in a direction approximately parallel to the direction frown which the signal was received from said first station.

20. Apparatus according to claim 18, wherein said first station includes a handle by which said first station can be held and transported, and said first SATPS measurement subsystem includes an SATPS antenna that is positioned in this handle.

21. Apparatus according to claim 18, wherein said second station includes a handle by which said second station can be held and transported, and said second SATPS measurement subsystem includes an SATPS antenna that is positioned in this handle.

22. The apparatus of claim 18, wherein said first SATPS measurement subsystem includes an SATPS antenna having an axis that is approximately parallel to said first station vertical axis.

23. The apparatus of claim 18, wherein said second SATPS measurement subsystem includes an SATPS antenna having an axis that is approximately parallel to said second station vertical axis.

24. The apparatus of claim 18, wherein said SATPS signals received by said first SATPS measurement subsystem and by said second SATPS measurement subsystem are carrier phase signals.

25. Apparatus for improved accuracy in measuring survey parameters, the apparatus comprising:
   a first station, having an axis that is locally vertical and having a first station housing and including distance measurement means, whose spatial orientation can be varied arbitrarily, for transmitting an electromagnetic signal including a selected wavelength, for determining the distance from the first station to a selected object that is spaced apart from the first station by receipt of a return electromagnetic signal from the object, for determining the elevation difference, if any, between the first station and the object, and for determining the angular displacement between a line drawn from the first station to the object and a selected reference line lying in a plane containing the first station;
   a first Satellite Positioning System (SATPS) antenna and first SATPS receiver/processor, electrically connected together and connected to the first station, for receiving SATPS signals from two or more SATPS satellites and for determining the location of the first station according to the SATPS signals, the first SATPS receiver/processor also being adapted for determining the difference, if any, between the location, known with high accuracy, of the first SATPS antenna and the location of the first SATPS antenna as determined by the SATPS satellite signals, the first SATPS antenna and first SATPS receiver/processor being retrofitted within and being contained within the first station housing;
   a first station communications means, connected to the first SATPS receiver/processor, for transmitting or receiving information on station location and on SATPS satellite attributes;
   a second station that is spaced apart from and movable relative to the first station and that acts as a mobile measurement unit for the survey, having an axis that is locally vertical, having a second station housing, and including distance measurement responder means, for receiving the electromagnetic signal transmitted by the distance measurement means and for providing a return electromagnetic signal that is received by the distance measurement means;
   a second SATPS antenna and second SATPS receiver/processor, electrically connected together and connected to the second station, for receiving SATPS signals from two or more SATPS satellites and for determining the location of the second station according to the SATPS signals, the second SATPS antenna and second SATPS receiver/processor being retrofitted within and being contained within the second station housing;
   a second station communications means, connected to the second SATPS receiver/processor, for communicating with the first station communications antenna and for transmitting or receiving information on station location and satellite attributes as determined by the SATPS satellite signals; and
   where at least one of the first SATPS receiver/processor and the second SATPS receiver/processor uses the first station location difference to correct the SATPS-determined location of the second station.

26. Apparatus according to claim 25, wherein said distance measurement responder means includes at least one electromagnetic wave retro-reflector that receives an electromagnetic signal from said first station and reflects this signal toward said first station in a direction approximately parallel to the direction from which the electromagnetic signal was received from said first station.

27. Apparatus according to claim 25, wherein said first station includes a handle by which said first station can be held and transported, and said first SATPS antenna is positioned in this handle.

28. Apparatus according to claim 25, wherein said second station includes a handle by which said second station can be held and transported, and said second SATPS antenna is positioned in this handle.

29. The apparatus of claim 25, wherein said first SATPS antenna has an axis that is approximately parallel to said first station vertical axis.

30. The apparatus of claim 25, wherein said second SATPS antenna has an axis that is approximately parallel to said second station vertical axis.

31. The apparatus of claim 25, wherein said first station further comprises a data output terminal, connected to at least one of said electronic distance meter or said first SATPS receiver/processor, to provide an output signal containing information on at least one of the following: (1) said location of said first station, as determined by said SATPS signals; (2) said known location of said first station; (3) said difference between said known location and said SATPS-determined location of said first station; (4) said distance from said first station to said selected object; (5) said elevation difference between said first station and said selected object; and (6) said angular displacement between said selected reference line and said line drawn from said first station to said selected object.

32. The apparatus of claim 25, wherein said SATPS signals received by said first SATPS antenna and receiver/processor and by said second SATPS antenna and receiver/processor are carrier phase signals.

33. Apparatus for improved accuracy in measuring survey parameters, the apparatus comprising:
   a first station, having an axis that is locally vertical and that acts as a mobile measurement unit for the survey, the first station comprising:
      a first station Satellite Positioning System (SATPS) antenna for receiving SATPS signals from two or more SATPS satellites;
      a first station communications means, connected to the first station SATPS antenna, for transmitting SATPS signal information on the first station location to another station; and
      distance measurement responder means for receiving an electromagnetic signal transmitted by a distance measurement means and for providing a return electromagnetic signal that is received by the distance measurement means; and a second station, having an axis that is locally vertical and being spaced apart from the first station, that provides a reference location for the survey and whose location is known with high accuracy, the second station comprising:

a second station communications means, for receiving SATPS information on the first station location that is transmitted by the first station communications means;

a second station Satellite Positioning System (SATPS) antenna and SATPS receiver/processor, connected together and connected to the second communications means, for receiving SATPS signals from two or more SATPS satellites, for determining the locations of the first station and of the second station according to the SATPS signals, the second station SATPS receiver/processor also being adapted for determining a second location difference, if any, between the known location of the second station and the location of the second station as determined by the SATPS satellite signals and for determining a corrected first station location which is corrected using the second station location difference; and distance measurement means, whose spatial orientation can be varied arbitrarily, connected to the second station SATPS receiver/processor, for transmitting an electromagnetic signal including a selected wavelength and for determining the distance from the second station to the first station by receipt of a return electromagnetic signal from the distance measurement responder means at the first station, for determining the elevation difference, if any, between the first station and the second station, and for determining the angular displacement between a line drawn from the first station to the second station and a selected reference line lying in a plane containing the second station.

34. The apparatus of claim 33, wherein said SATPS signals received by said first and second SATPS antennas are carrier phase signals.

35. The apparatus of claim 33, further comprising a user interface means for receiving information from said second SATPS measurement subsystem and from said data processing subsystem, and for displaying at least one of said known location of said second station or said corrected first station location.

36. Apparatus for improved accuracy in measuring survey parameters, the apparatus comprising:

a first station, having an axis that is locally vertical, that acts as a mobile measurement unit for the survey, the first station comprising:

a first SATPS measurement subsystem for a Satellite Positioning System for receiving SATPS signals from two or more SATPS satellites;

a first station measurement subsystem, for receiving an electromagnetic signal from another station and for providing a return electromagnetic signal to the other station; and a first station communications subsystem, connected to the first SATPS measurement subsystem, for transmitting SATPS information on the first station location to another station; and a second station, having an axis that is locally vertical and being spaced apart from the first station, that provides a reference measurement unit for the survey and whose location is known with high accuracy, the second station comprising:

a second station communications subsystem, for receiving SATPS signal information frown the first communications subsystem;

a second SATPS measurement subsystem for a Satellite Positioning System, connected to the second station communications subsystem, for receiving SATPS signals from two or more SATPS satellites and for determining the location of the first station and of the second station according to the SATPS signals;

a second station measurement subsystem, having a spatial orientation that can be varied arbitrarily, connected to the second SATPS measurement subsystem, for transmitting electromagnetic waves having a selected wavelength to the first station, for receiving a return electromagnetic signal from the first station, for determining an object distance from the second station to the first station from the return electromagnetic signal, for determining the elevation difference, if any, between the first station and the second station, and for determining the angular displacement between a line drawn from the first station to the second station and a selected reference line lying in a plane containing the second station; and a data processing subsystem for receiving signals from the second SATPS measurement subsystem and from the second station measurement subsystem, for determining a second station location difference, if any, between the known location of the second station and the location of the second station as determined by the SATPS satellite signals and for determining a corrected first station location, which is corrected using the second station location difference.

37. The apparatus of claim 36, wherein said SATPS signals received by said first and second SATPS measurement subsystems are carrier phase signals.

38. The apparatus of claim 36, further comprising a user interface means for receiving information from said second SATPS measurement subsystem and from said data processing subsystem, and for displaying at least one of said known location of said second station or said corrected first station location.

39. A method for measuring one or more parameters for a survey with improved accuracy, the method comprising the steps of:

providing a first station, having an axis that is locally vertical, that acts as a reference station for the survey and that has a location that is known with high accuracy;

receiving SATPS signals from two or more SATPS satellites at the first station, computing an SATPS-determined location of the first station, and determining the difference between the SATPS-determined location of the first station and the known location of the first station, where the SATPS signals are carrier phase signals that have one or more phase integer ambiguities associated therewith;

transmitting electromagnetic signals from the first station to a selected object that is spaced apart from the first station and receiving return electromagnetic signals from the object;

using the return electromagnetic signals to determine at least one of the distance d from the first station to the object, the elevation difference $d_v$ between the first station and the object, a first angular displacement $\theta_v$ between a line drawn from the first station to the object and a first selected reference line in a horizontal plane containing the first station, and a second angular displacement $\theta_h$ between a line drawn from the first station to the object and a second selected reference line lying in a plane containing the first station;

providing as the selected object a second station, having an axis that is locally vertical, that is spaced apart float the first station and that acts as a mobile measurement unit for the survey;

receiving SATPS signals from two or more SATPS satellites at the second station and using these received SATPS signals to determine an SATPS-determined location of the second station; and correcting the SATPS-determined location of the second station, based upon the difference between the SATPS-determined location of the first station and the known location of the first station.

40. The method of claim 39, further comprising the step of using at least one of said distance d, said elevation difference $d_v$, said angular displacement $\theta_v$ and said angular displacement $\theta_h$ to reduce the number of said phase integer ambiguities associated with a solution for said SATPS-determined location of said first station.

* * * * *